United States Patent [19]
Ingwersen

[11] Patent Number: 5,490,653
[45] Date of Patent: Feb. 13, 1996

[54] CUP HOLDER ACCESSORY

[76] Inventor: John A. Ingwersen, 1050 Bryden Rd., Columbus, Ohio 43205

[21] Appl. No.: 326,381

[22] Filed: Oct. 20, 1994

[51] Int. Cl.⁶ .................................................. A47K 1/08
[52] U.S. Cl. ........................................ 248/311.2; 248/315
[58] Field of Search ......................... 248/311.2, 315, 248/231.3, 316.2, 314, 500; 297/188.14, 188.15, 188.16, 188.18

[56] References Cited

U.S. PATENT DOCUMENTS

| | | | |
|---|---|---|---|
| 4,854,468 | 8/1989 | Dahlquist, II et al. | 220/85 |
| 5,088,673 | 2/1992 | Chandler | 248/311.2 |
| 5,174,534 | 12/1992 | Mitchell | 248/311.2 |
| 5,330,145 | 7/1994 | Evans et al. | 248/311.2 |

Primary Examiner—Leslie A. Braun
Assistant Examiner—Anita M. King
Attorney, Agent, or Firm—Thomas S. Baker, Jr.

[57] ABSTRACT

A cup holder accessory for supporting an over-size drink cup in a standard-size drink cup receptacle, is provided with a base element that cooperates with the standard-size drink cup receptacle, with an over-size drink cup receptacle supported by and rotatable relative to the base element, a cam element positioned within the base element and rotated and projected outside the base element when the over-size drink cup receptacle is rotated relative to the base element, and a fastener element joining the base element, the over-size drink cup receptacle element, and the cam element into a unitary assembly.

6 Claims, 3 Drawing Sheets

5,490,653

CUP HOLDER ACCESSORY

FIELD OF THE INVENTION

This invention relates generally to drink cup holders such as are commonly provided in automotive vehicles, and particularly concerns an accessory which may be readily utilized in combination with an original-equipment drink cup holder installation to accommodate drink cups having much larger overall dimensions in comparison to drink cups for which the drink cup holder installation was originally intended.

BACKGROUND OF THE INVENTION

Automobiles currently being sold in the United States are typically provided with a built-in or original-equipment drink cup holder installation that frequently is in the form of a between-the-front seats console having a side-by-side pair of well-like drink cup receptacles that are each sized to just loosely receive the frustro-conical lower portion of a standard size drink cup—usually of eight liquid ounce capacity. However, increasing numbers of drinks in comparatively larger or oversize drink cups are being purchased by the public and such larger cups cannot be accommodated by the original-equipment drink cup holder installation.

Thus, increasingly an automobile driver or other passenger seated adjacent the built-in drink cup holder and having a drink contained in an oversize cup must continuously hold the oversize drink cup for want of a suitable cup holder. Having to do so poses a driving safety hazard, especially in the case of the automobile driver who now has only one free hand for use in driving control of the automobile.

I have discovered that a properly-proportioned accessory may be provided which functions to cooperate with the cup holder for standard sized cups and to readily receive the base portions of drink cups that are comparatively larger than the standard sized drink cups.

SUMMARY OF THE INVENTION

To attain the objectives of this invention I provide a drink cup holder accessory which is comprised of an adaptor base element, an oversize cup holder element rotatably and eccentrically mounted on the adaptor base element, and a cam element contained within the adaptor base element and rotatably coupled to the oversize cup holder element. Rotation of the cam element by the oversize cup holder element through a sufficient angle after the accessory has been placed into cooperation with the standard-sized cup holder causes an end of the cam element to pass through an opening in the sidewall of the adaptor base element and make wedging contact with the sidewall of the standard-sized cup holder. The accessory is thus cooperatively combined with the built-in drink cup holder in a stable position and manner.

Other advantages associated with the instant invention will become apparent during a careful consideration of the drawings, detailed description, and claims which follow.

DETAILED DESCRIPTION

Figure 1:
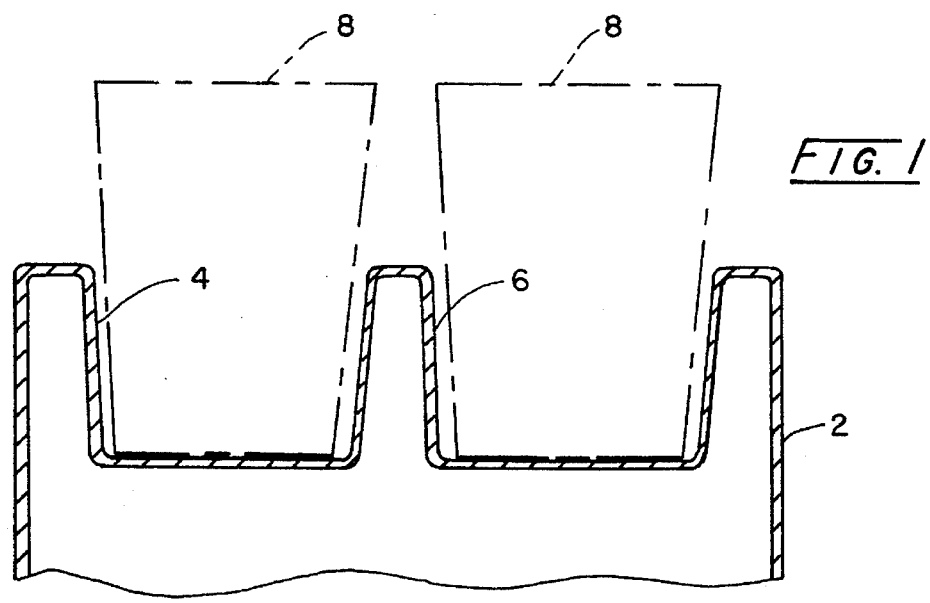
FIG. 1 is a schematic sectional view through a prior art built-in type, between-seat automobile console having a pair of side-by-side drink cup holder receptacles and illustrating use of the receptacles for holding a pair of standard-size beverage cups.

FIG. 1 illustrates, in section, a portion of a typical automobile, between-the-front seats, molded console 2 that is provided with a pair of side-by-side, well-like receptacles 4 and 6 which normally function to hold standard-size drink cups 8 or other similarly-sized beverage containers such as standard 12 ounce beverage cans. In most instances receptacles are spaced-apart by a distance of approximately 3½ inches center-to-center, and each such receptacle has an internal diameter at its bottom of approximately 2¾ inches. As indicated above, such typical drink holders or console receptacles are inadequate for the purpose of holding over-sized drink cups which typically have a frustroconical external configuration, have a base diameter of approximately 3 inches, and have a top diameter of approximately 4 inches. Thus, in order to utilize console 2 for the purpose of holding the over-size drink cup it becomes necessary to provide a suitable adaptor or adapters for co-operation with the console receptacles 4 and 6 and with the over-size beverage containers.

Figure 2:
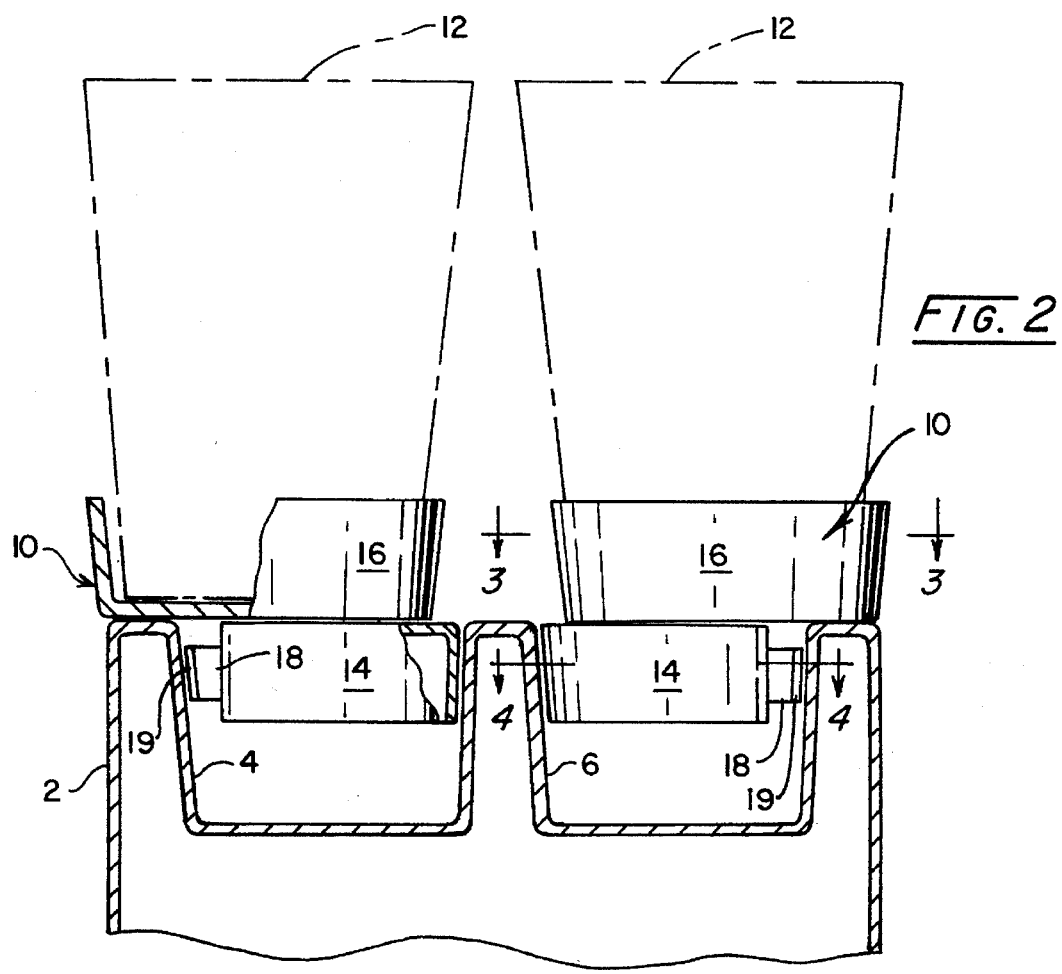
FIG. 2 is similar to FIG. 1 but illustrating use of the receptacles for holding a pair of over-size beverage cups by means of a co-operating pair of the drink cup holder accessories of this invention.
Figure 3:
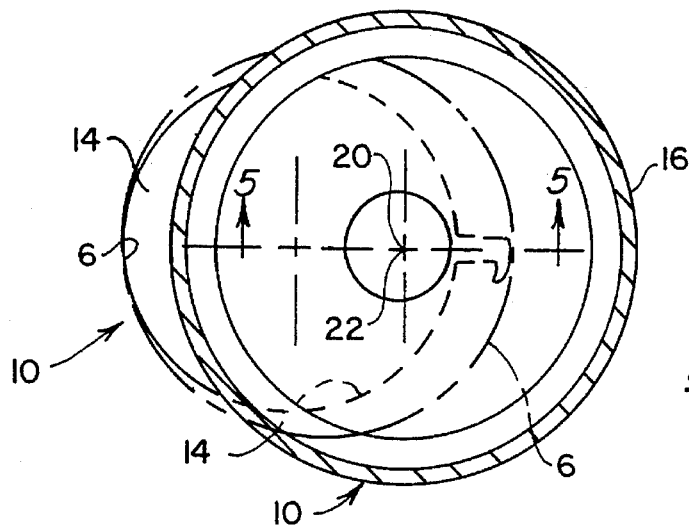
FIG. 3 is a sectional view taken along line 3—3 of FIG. 2.
Figure 4:
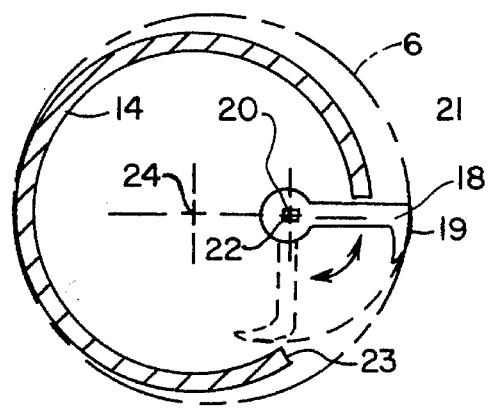
FIG. 4 is a sectional view taken along line 4—4 of FIG. 2.
Figure 5:
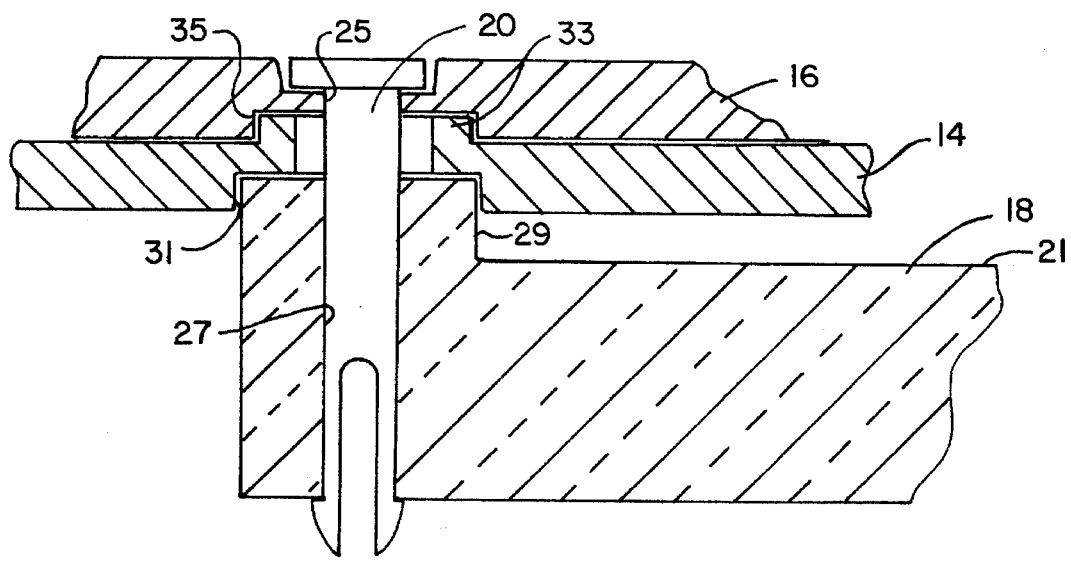
FIG. 5 is a sectional view taken along line 5—5 of FIG. 3.

In FIG. 2 I illustrate the console 2 with a drink cup holder accessory 10 of my invention co-operably positioned partially within each of receptacles 4 and 6 and with an over-sized drink cup 12 held in the upper portion of each drink cup holder accessory 10. Also as shown in FIG. 2, each accessory 10 is essentially comprised of a base element 14, an over-size drink cup receptacle element 16 rotatably supported on and by base element 14, a cam element be which may be adjustably rotated to be projected from within base element 14 and make contact with the sidewall of a console receptacle such as 4 or 6, and a fastener element 20 (see FIGS. 3 through 5) which functions to unitarily join elements 14, 16, and be as hereinafter described. It should be noted in the FIG. 2 illustration that neither drink cup 12 intrudes into space occupied by the other drink cup 12 as would be the case in attempting to position over-size cups 12 directly into adjacent receptacles 4 and 6.

Over-size drink cup receptacle element 16 is preferably fabricated of a molded thermoplastic resin such as high-density polyethylene and has an axis of rotation 22 that corresponds to the longitudinal axis of fastener 20 and that is offset with respect to the longitudinal axis 24 of accessory base element 14. Cam element 18, shown in its extended or projected position by solid lines in FIG. 4 and in its retracted position by dotted lines, is positioned to rotate about the longitudinal axis 22 of receptacle element 16. Cam element 18 has a curved vertical cam surface 19 and a flat horizontal top surface 21. In its extended position, cam element 18 projects through an open section 23 of base element 14.

Also, although receptacle element 16 is joined to base element 14 in a manner which permits relative rotation between those two element, cam element 18 is incorporated into the accessory assembly 10 in a manner whereby rotation of receptacle element 16 causes like rotation of the cam element. Such may be accomplished by using a fastener element 20 that has a non-circular cross-sectional configuration and by providing fastener openings that are like-sized and like-configured in the upper surface central recess 25 incorporated in the bottom of receptacle element 16 and in the hub region 27 of cam element 18. In the preferred embodiment of the invention illustrated in the drawings I utilize a fastener element 20 having a square cross-sectional configuration (see FIG. 4). Other non-circular cross-sections (e.g., triangular, hexagonal, etc.) may alternatively be selected and utilized.

Also, it is important that axis of rotation 22 of receptacle element 16 must be laterally offset from the central longitudinal axis 24 of base element 14 a sufficient distance to assure that the uppermost portions of over-size drink cups 12 do not contact each other. In the case of the previously-described standard-size and over-size drink cups and the typical spacing between adjacent console receptacles 4 and 6 such distance should be at least approximately ½ inch. For suggested details of the "nesting" of the uppermost portion of the hub region 29 of cam element 18 in a recess 31 in the undersurface of the top of base element 14, and the "nesting" of the uppermost surface of a boss 33 provided in the top surface of element 14 in a recess 35 in the undersurface of the bottom of receptacle element 16 see FIG. 5.

As previously indicated, after the base element 14 of assembly 10 has been properly placed and oriented in either of console receptacles 4 or 6, it is only necessary to rotate over-size drink cup receptacle element 16 relative to base element 14 until the arcuate end 19 of cam element 18 is brought into contact with the sidewall of a console receptacle to thus firmly position accessory 10 in place. Although not shown in the drawings, co-operating detent elements may be provided in the undersurface of receptacle element 16 and the upper surface of base element 14 to in some cases facilitate proper positioning of those element relative to each other.

Figure 7:
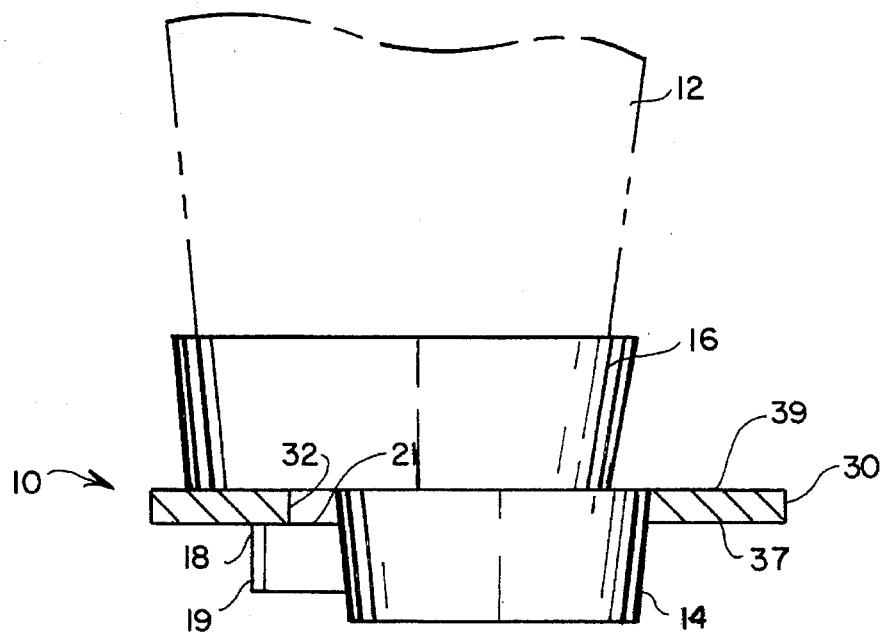
FIG. 7 illustrates the first embodiment of Applicant's invention inserted in an opening in an alternate type of automotive drink cup holder.

The drink cup holder accessory 10 of the present invention also may be utilized in connection with an automobile cup holder accessory 30 which utilizes a pair of side-by-side, circular openings 32 as opposed to the cup like receptacles 4 and 6 shown in FIGS. 1 and 2. A receptacle 30 having a single circular opening 32 may be seen by referring to FIG. 7. The drink cup holder accessory 10 is secured within the opening 32 of receptacle 30 by the extension of cam element 18 such that its flat horizontal top surface 21 engages the bottom surface 37 of receptacle 30 whereas the over-size drink cup receptacle element 16 bottom surface engages the top surface 39 of receptacle 30.

Figure 6:
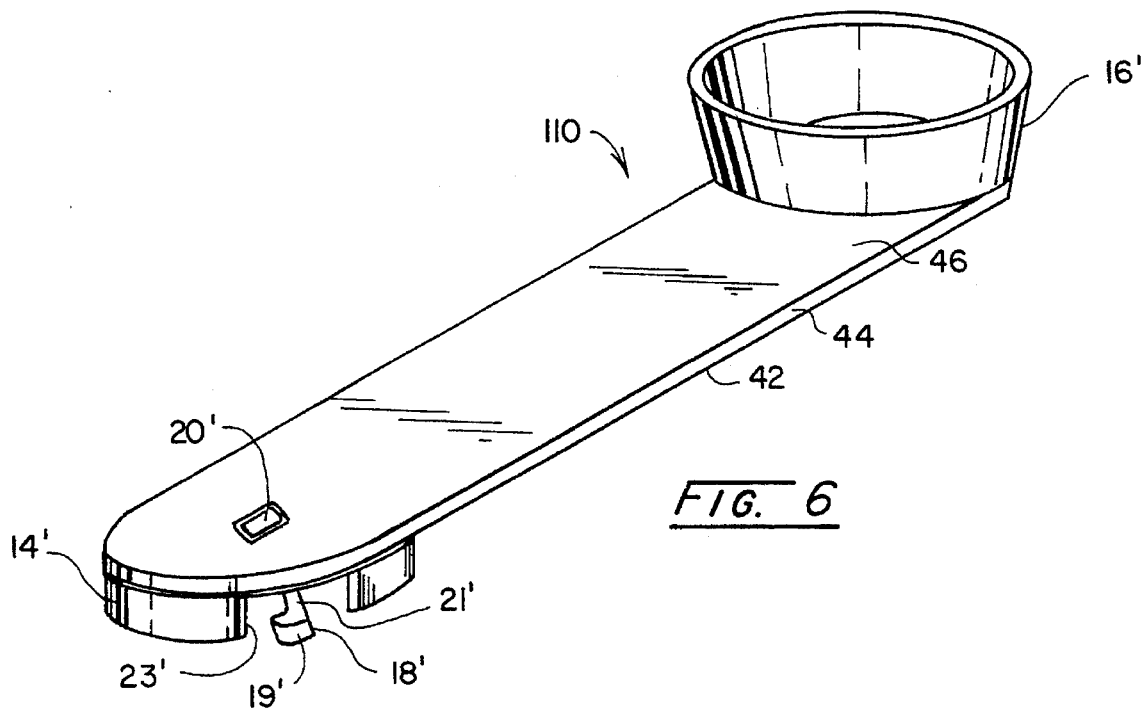
FIG. 6 illustrates an alternate embodiment of Applicant's invention.

An alternate embodiment of Applicant's drink cup holder accessory 10 may be seen by referring to FIG. 6. Elements of the alternate embodiment drink cup holder accessory 40 identical to those of drink cup holder accessory 10 are indicated by identical primed numerals. As seen in FIG. 6, drink cup holder accessory 40 has a base element 14' having an open wall portion 23' rotatably attached to the bottom surface 42 of a base extension element 44. A cam element 18' is pivotally mounted within base element 14' by a fastener element 20' at one end of base extension element 44. An over-size drink cup receptacle element 16' is mounted on the upper surface 46 at the opposite end of the base extension element 44. Thus, it may be seen that base extension element 44 serves to increase the horizontal distance between the central longitudinal axis of base element 14' and that of over-size drink cup receptacle element 16'. This enables over-size drink cup receptacle element 16' to be enlarged to accommodate super-size drink cups and to position the over-size drink cup receptacle element 16' such that it will not interfere with any portion of the automobile. Drink cup holder accessory 40 is manufactured utilizing the same materials as drink cup holder accessory 10.

Additionally, cam element 18' is incorporated into the accessory assembly 40 in a manner whereby rotation of receptacle element 16' causes like rotation of the cam element 18' in the same manner as described with respect to drink cup holder accessory 10. That is, fastener 20' having a non-circular cross-sectional area passes through a complementary shaped opening in extension element 44 and rigidly attaches to cam element 18'. However, whereas in drink cup holder accessory 10 it was important that the axis of rotation 22 of receptacle element 16 be laterally offset from the central longitudinal axis of base element 14 a sufficient distance to assure that the uppermost portion of over-size drink cups do not contact each other, with respect to drink cup holder accessory 40, it is only important that the longitudinal axis of over-size drink cup receptacle element 16' be offset from the longitudinal axis of base element 14' a sufficient distance to assure that the uppermost portion of over-size drink cups do not contact each other.

It should be noted that the hub region of cam element 18' nests in a recess in the undersurface 42 of base element 14' in a similar manner as described in connection with drink cup holder accessory 10. Also, where a boss 33 on base element 14 nested within a recess 35 in the bottom of cup receptacle element 16 in drink cup holder accessory 10, a boss, not shown, provided in the top surface of element 14' resides in a recess in the undersurface 42 of base extension element 44.

Other materials, and other component shapes and sizes may be used in the practice of this invention without departing from the scope of the following claims.

I claim my invention as follows:

1. A cup holder accessory for supporting an over-size drink cup in a standard-size cup receptacle comprising:

a base element having a longitudinal axis;

an over-size cup receptacle element having a longitudinal axis and being rotatably supported upon said base element;

a cam element positioned within said base element, having an axis of rotation, being rotationally connected to said over-size cup receptacle element and projecting outside said base element when rotated; and a fastener element joining said base element, said over-size cup receptacle element, and said cam element into a unitary assembly, said cam element axis of rotation being aligned with said over-size cup receptacle longitudinal axis, and said cam element and said over-size cup receptacle longitudinal axis each being laterally offset with respect to said base element longitudinal axis.

2. The cup holder accessory defined by claim 1 wherein said fastener element has a non-circular cross-sectional configuration, said over-size cup receptacle element having a central opening provided with a configuration corresponding to said fastener element non-circular cross sectional configuration.

3. The cup holder accessory defined by claim 1 wherein said cam element has a contoured contact surface portion, said cam element contoured contact surface portion having a contour generally corresponding to a contour of said standard-size cup receptacle.

4. A cup holder accessory for supporting an over-size drink cup in a standard-size cup receptacle comprising:

- a base extension element having a top surface and a bottom surface;
- a base element having a longitudinal axis and attached to the bottom surface of said base extension element;
- an over-size cup receptacle element having a longitudinal axis and attached to the top surface of said base extension element;
- a cam element having an axis of rotation positioned within said base element, being rotationally connected to said base extension element and movable between a first position in which it resides with said base element and a second position in which it projects beyond said base element;
- a fastener element joining said base element, said base extension element, and said cam element into a unitary assembly;
- said cam element axis of rotation being aligned with the axis of rotation of said base extension element, and wherein said over-size cup receptacle element longitudinal axis is laterally displaced relative to said base element longitudinal axis.

5. The cup holder accessory defined by claim 4 wherein said fastener element has a non-circular cross-sectional configuration, said base extension element having an opening provided with a configuration corresponding to said fastener element non-circular cross-sectional configuration.

6. The cup holder accessory defined by claim 5 wherein said cam element has a vertical cam contact surface portion, said cam element vertical contact surface portion having a contour which complements a contour of said standard-size cup receptacle.

* * * * *